United States Patent
Nishikawa et al.

(10) Patent No.: US 10,300,764 B2
(45) Date of Patent: May 28, 2019

(54) DIAGNOSTIC FUNCTION FOR BRUSHLESS BLOWER MOTOR

(71) Applicants: DENSO International America, Inc., Southfield, MI (US); DENSO CORPORATION, Kariya-shi, Aichi-ken (JP)

(72) Inventors: Katsumi Nishikawa, West Bloomfield, MI (US); Claudia Gonzalez, Kariya (JP); Kazuki Kita, Novi, MI (US); Shunji Yamauchi, Kariya (JP)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/182,266

(22) Filed: Jun. 14, 2016

(65) Prior Publication Data
US 2016/0368346 A1    Dec. 22, 2016

Related U.S. Application Data

(60) Provisional application No. 62/181,446, filed on Jun. 18, 2015.

(51) Int. Cl.
*H02P 6/08* (2016.01)
*B60H 1/00* (2006.01)
(Continued)

(52) U.S. Cl.
CPC ..... *B60H 1/00978* (2013.01); *B60H 1/00457* (2013.01); *B60H 1/00828* (2013.01);
(Continued)

(58) Field of Classification Search
CPC ............ B60H 1/00428; B60H 1/00814; Y02T 10/7005; B60W 20/00; B60W 10/08; G05B 11/28; G05B 2219/42237
See application file for complete search history.

(56) References Cited

U.S. PATENT DOCUMENTS

| | | | |
|---|---|---|---|
| 4,827,730 A | 5/1989 | Doi et al. | |
| 4,926,352 A * | 5/1990 | Staffe | B60H 1/00978 |
| | | | 340/462 |

(Continued)

FOREIGN PATENT DOCUMENTS

| | | |
|---|---|---|
| CN | 204145346 U | 2/2015 |
| CN | 204283951 U | 4/2015 |

(Continued)

OTHER PUBLICATIONS

International Search Report and Written Opinion in corresponding PCT Application No. PCT/US2016/037876 dated Sep. 23, 2016.

*Primary Examiner* — Rina I Duda
(74) *Attorney, Agent, or Firm* — Harness, Dickey & Pierce, P.L.C.

(57) ABSTRACT

The present disclosure generally relates to a method for monitoring the performance of a blower motor for a blower unit positioned in a vehicle. The method may include: diagnosing the motor based on predefined criteria and one or more physical parameters sensed by one or more sensors; identifying a performance mode from among a plurality of modes based on the diagnosis, where the plurality of modes are predefined; determining a mode message based on a signal code protocol, where the mode message is indicative of the performance mode identified and the signal code protocol associates each of the plurality of modes with a different coded signal; and transmitting a diagnostic signal (Continued)

that includes the mode message to a climate control module located in the vehicle separate from the motor.

16 Claims, 10 Drawing Sheets

(51) Int. Cl.
*F04D 27/00* (2006.01)
*H02P 29/02* (2016.01)
*H02H 7/08* (2006.01)

(52) U.S. Cl.
CPC ......... *F04D 27/004* (2013.01); *F04D 27/008* (2013.01); *H02P 6/08* (2013.01); *H02P 29/02* (2013.01); *H02H 7/08* (2013.01)

(56) References Cited

U.S. PATENT DOCUMENTS

| | | | |
|---|---|---|---|
| 5,294,050 A * | 3/1994 | Hoffman | B60H 1/00814 |
| | | | 165/202 |
| 5,491,631 A * | 2/1996 | Shirane | F02D 41/22 |
| | | | 123/479 |
| 5,796,332 A | 8/1998 | Steiert | |
| 6,273,034 B1 * | 8/2001 | Hawkins | F01P 5/14 |
| | | | 123/41.11 |
| 6,736,327 B1 | 5/2004 | Hersel et al. | |
| 6,988,670 B2 * | 1/2006 | Keen | B60H 1/00792 |
| | | | 165/43 |
| 7,797,958 B2 * | 9/2010 | Alston | B60H 1/00428 |
| | | | 165/43 |
| 7,834,522 B2 * | 11/2010 | Guo | B06B 1/0622 |
| | | | 310/334 |
| 7,918,296 B2 * | 4/2011 | Reddy | B60K 1/02 |
| | | | 180/68.2 |
| 8,030,880 B2 * | 10/2011 | Alston | B60H 1/00428 |
| | | | 320/103 |
| 8,381,540 B2 * | 2/2013 | Alston | B60H 1/00428 |
| | | | 165/43 |
| 8,863,540 B2 * | 10/2014 | Alston | B60H 1/00428 |
| | | | 165/43 |
| 2004/0232864 A1 | 11/2004 | Sunaga et al. | |
| 2009/0096398 A1 * | 4/2009 | Kyrtsos | H02P 1/04 |
| | | | 318/432 |
| 2009/0105927 A1 * | 4/2009 | Arai | B60H 1/00978 |
| | | | 701/102 |
| 2010/0106809 A1 * | 4/2010 | Grohman | B60H 1/00642 |
| | | | 709/220 |
| 2010/0106810 A1 | 4/2010 | Grohman | |

FOREIGN PATENT DOCUMENTS

| | | |
|---|---|---|
| JP | H 11306445 A | 11/1999 |
| JP | 2004357473 A | 12/2004 |

* cited by examiner

| Mode | Number of Pulses | Priority |
|---|---|---|
| No Failure | 1 | 1 |
| Over Current | 2 | 2 |
| Current Limitation | 3 | 3 |
| Locked Rotor | 4 | 2 |
| Over Heat A | 5 | 4 |
| Over Heat B | 6 | 5 |
| Over Heat C | 7 | 2 |
| Over Voltage | 8 | 6 |
| Under Voltage | 9 | 2 |
| Input Open or Short PWR | 10 | 7 |
| Input Short to GND | 11 | 8 |

| Mode | Condition | Action | Reset |
|---|---|---|---|
| Over Current | Current draw measured by the shunt resistor is > 55 A during 0.6 s. | Circuit shuts off all power to FETs. | Blower Controller will turn on FETs after 20 S. for 5 total attempts. Attempts will reset after vehicle IGN is reset. |
| Current Limitation | Input power limited from 13-16 V and 351W to protect the FETs. (Load point requirement still accomplish) | Decrease PWM output until input power is lower then 351W | Condition will be reset when input power is lower than 351W |
| Locked Rotor | Microcomputer detects no rotation from the hall sensor after 2.7 s. | Turn off all power to the motor. | Condition will be reset after 20 s for 5 total attempts. Attempts will reset after vehicle IGN is reset. |
| Over Heat A | Before Limp Mode | Speed motor will be affected. | Condition will be reset when the temperature falls 2° C from Over Heat A threshold |
| Over Heat B | The thermistor positioned near the FET reaches a temperature correlated to the atmosphere temperature of ~65°C (program dependent) | Motor reduce speed (Limp Mode) | Condition will be reset when the temperature falls 20° C from Over Heat B threshold |
| Over Heat C | The thermistor positioned near the FET reaches a temperature correlated to the atmosphere temperature of ~85°C. | Motor shuts down. | Condition will be reset when the temperature falls until Over Heat B threshold |
| Over Voltage | If the applied voltage is > 18 V and the motor's PWM % is < 30 % | Increase PWM % to 30 % during 2 s. | Conditions will be reset when applied voltage is <= 16 V |
| Under Voltage | Supply voltage < 7.5 V | The motor will stop until supply voltage > 8.5 V. | Conditions will be reset when applied voltage is > 8.5 V |
| Input Open or Short to PWR | PWM Input = 0% | Motor shuts down. | Conditions will be reset when PWM input between 5 % to 95 % (±5) |
| Input short to GND | PWM Input = 100% | Motor shuts down. | Conditions will be reset when PWM input between 5 % to 95 % (±5) |

FIG - 4

| Mode | Digits | Priority |
|---|---|---|
| No Failure | 0000=0 | 1 |
| Over Current | 0001=1 | 2 |
| Current Limitation | 0010=2 | 3 |
| Locked Rotor | 0011=3 | 2 |
| Over Heat A | 0100=4 | 4 |
| Over Heat B | 0101=5 | 5 |
| Over Heat C | 0110=6 | 2 |
| Over Voltage | 0111=7 | 6 |
| Under Voltage | 1000=8 | 2 |
| Input Open or Short PWR | 1001=9 | 7 |
| Input Short to GND | 1010=10 | 8 |

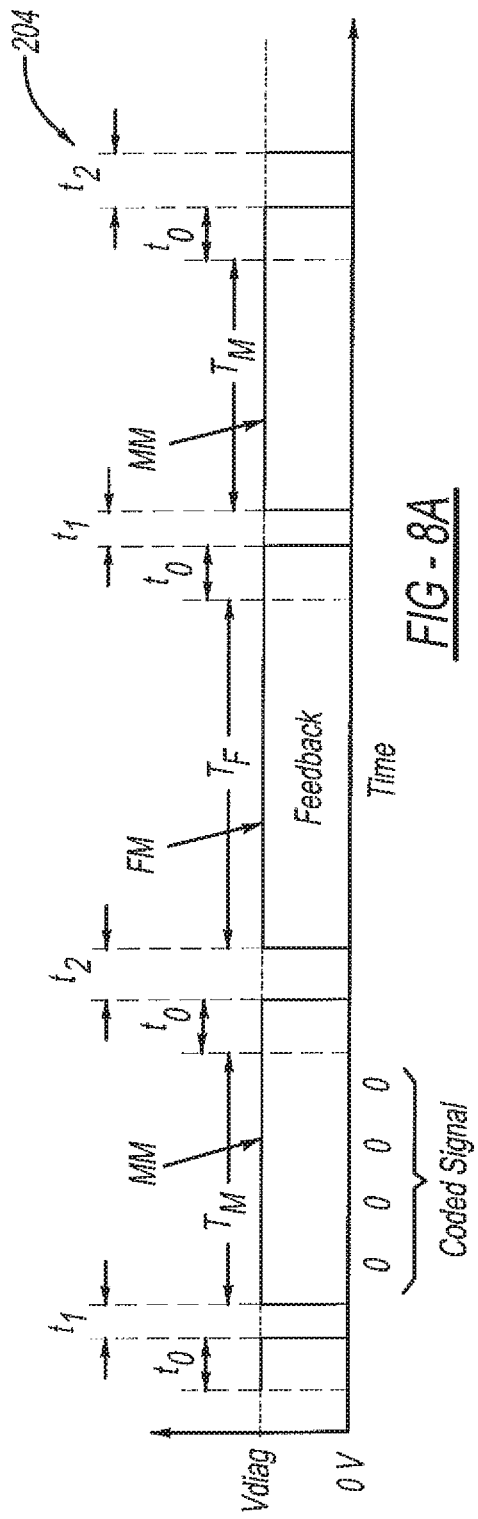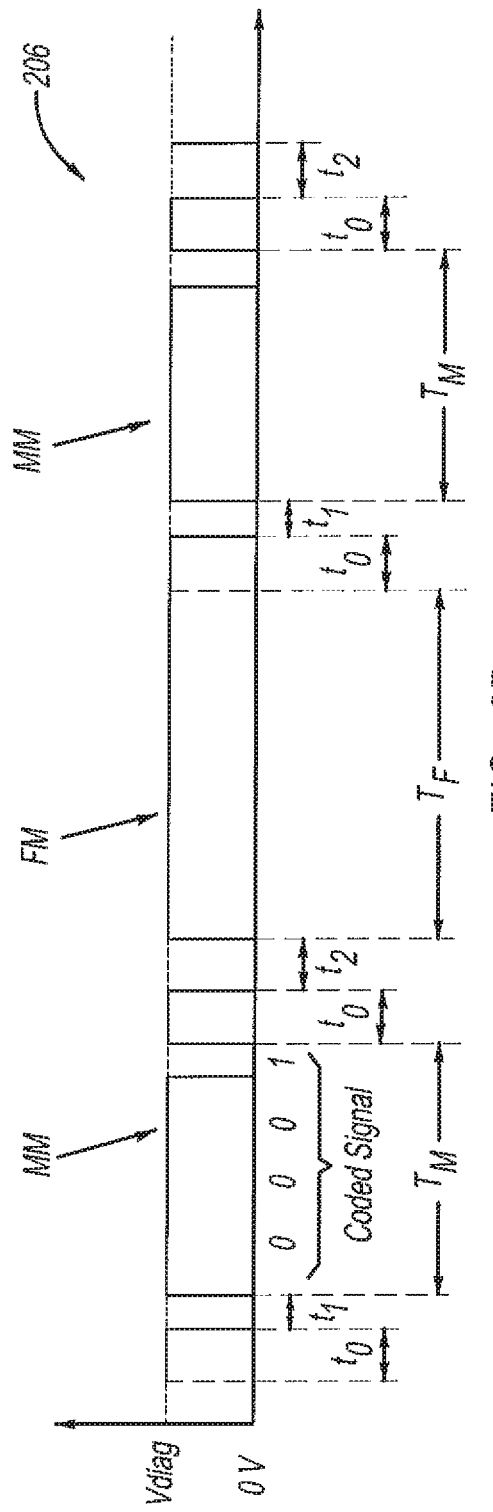

DIAGNOSTIC FUNCTION FOR BRUSHLESS BLOWER MOTOR

CROSS-REFERENCE TO RELATED APPLICATIONS

This application claims the benefit of U.S. Provisional Application No. 62/181,446, filed on Jun. 18, 2015. The entire disclosure of the above application is incorporated herein by reference.

FIELD

The present disclosure relates to performing a diagnostic on a blower motor disposed in a vehicle.

BACKGROUND

This section provides background information related to the present disclosure which is not necessarily prior art.

Vehicles are known to incorporate a heating, ventilation, and air conditioning (HVAC) system to improve the comfort of the people within the passenger compartment of the vehicle. The HVAC system heats and cools air blown through the HVAC system using a heating heat exchanger and/or a cooling heat exchanger. The air blown through the HVAC system is drawn in via a blower unit which draws in air from outside the vehicle. The air then flows through the HVAC system where it is conditioned (heated/cooled) and then directed into the passenger compartment of the vehicle through one or more outlet vents.

The blower unit can include a blower motor and a blower control module that receives control signals from a climate control module to operate the motor at a desired speed. The control signal may be a pulse width modulation (PWM) signal. The blower control module may transmit a feedback signal that indicates the current speed of the blower motor to the climate control module and is used by the climate control module to monitor the speed of the blower motor. To effectively operate the blower motor, the climate control module may also need to know the overall operation status of the blower motor. For example, the climate control module may need information indicating whether the blower motor is operating normally or if a specific failure has been detected.

SUMMARY

This section provides a general summary of the disclosure, and is not a comprehensive disclosure of its full scope or all of its features.

The present disclosure is generally directed toward a method for monitoring the performance of a blower motor and a blower unit for a HVAC system in a vehicle. As described in detail, the method and the blower unit of the present disclosure, provide a climate control module with information regarding the performance of the blower motor, which can be used to control the operation of the blower motor. Thus, the blower unit can be operated efficiently by the climate control module.

In an aspect, the present disclosure generally relates to a method for monitoring the performance of a motor for a blower unit positioned in a vehicle. The method may include: sensing one or more physical parameters of the motor by way of a sensor located at the motor; diagnosing the motor based on predefined criteria and the one or more physical parameters sensed by the sensor; identifying a performance mode from among a plurality of modes based on the diagnosis, where the plurality of modes are predefined; determining a mode message based on a signal code protocol, where the mode message is indicative of the performance mode identified and the signal code protocol associates each of the plurality of modes with a different coded signal; and transmitting a diagnostic signal that includes the mode message to a climate control module located in the vehicle separate from the motor.

In another aspect, the present disclosure is generally directed toward a blower unit for a HVAC system provided in a vehicle. The blower unit may include a blower motor operable to draw air into the HVAC system and a blower motor control module. The blower motor control module may include a driver that operates the blower motor at a desired speed and a diagnostic module. The diagnostic module may diagnose the blower motor with a performance mode identified from among a plurality of modes and transmits a diagnostic signal that includes a mode message indicative of the performance mode to a climate control module of the HVAC system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a performance mode table that defines a plurality of modes of the motor;

FIGS. 8A and 8B illustrate diagnostic signals that include a mode message and a feedback message based on the second signal code protocol;

Corresponding reference numerals indicate corresponding parts throughout the several views of the drawings.

DETAILED DESCRIPTION

Figure 1:
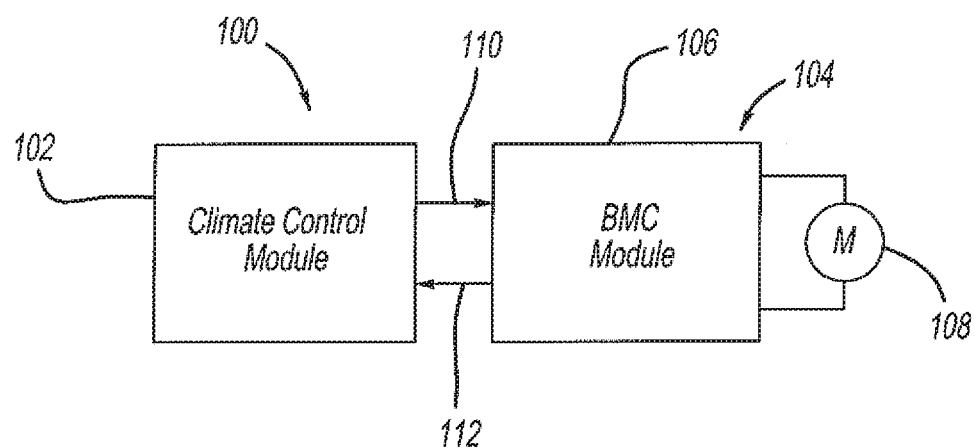
FIG. 1 is a block diagram of a heating, ventilation, and air conditioning (HVAC) system of a vehicle.
Figure 2:
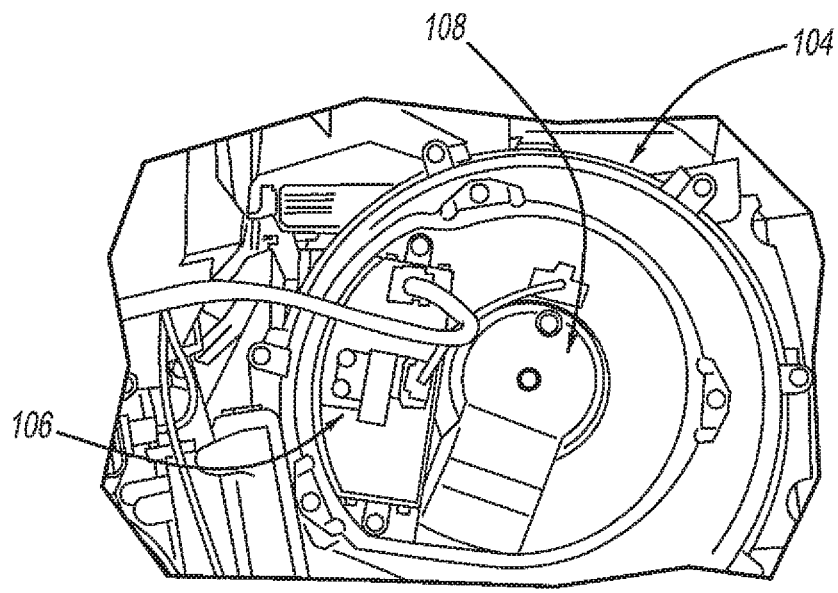
FIG. 2 is a schematic of a blower motor control (BMC) module disposed at a motor of a blower unit.

The present disclosure will now be described more fully with reference to the accompanying drawings. With reference to FIGS. 1 and 2, a heating, ventilation, and air conditioning (HVAC) system 100 for a vehicle may include a climate control module 102 and a blower unit 104. The blower unit 104 draws in air into a housing of the HVAC system 100. The air is then conditioned by other components of the HVAC system 100 before being supplied to a passenger compartment of the vehicle.

The blower unit 104 may include a blower motor control (BMC) module 106, a motor 108, and a scroll (not shown) attached to the motor 108. The motor 108 and the scroll may be referred to as a blower motor. The motor 108 may be a brushless motor and is operable by the BMC module 106 to rotate the scroll at a desired speed. The BMC module 106 may be disposed with the motor 108. For example, FIG. 2 illustrates an example configuration in which the BMC module 106 is disposed with the motor 108. Alternatively, the BMC module 106 may be disposed at other suitable locations and is not limited to the position illustrated in FIG. 2 and/or to the motor 108. For example, the BMC module 106 may be positioned at a location separate from the motor 108.

The climate control module 102 controls the overall operation of the HVAC system 100 to have the HVAC system 100 supply conditioned air to the passenger cabin of the vehicle. As an example, a user may input a desired air temperature and air speed via one or more user interfaces (e.g., knob, touchscreen) disposed along an instrument panel of the vehicle. The climate control module 102 may then determine a performance output of one or more components within the HVAC system 100, such as the blower unit 104 to have the HVAC system deliver air at the desired temperature and air speed.

In the example embodiment, the climate control module 102 controls the flow of air into the HVAC system 100 by controlling the blower unit 104. Specifically, the climate control module 102 may determine a desired operation speed of the motor 108 and may output a pulse width modulation (PWM) signal 110, which is indicative of the desired operation speed, to the BMC module 106 of the blower unit 104. The BMC module 106 may then drive the motor 108 based on the PWM signal 110. The PWM signal 110 is represented as arrow 110 in the figures.

In addition to controlling the operation of the motor 108, the BMC module 106 also monitors the motor 108 to determine a diagnosis of the motor 108, as described in detail below. The BMC module 106 may transmit a diagnostic signal (i.e., a diagnostic message) to the climate control module 102, where the diagnostic signal includes information representing, for example, a speed of the motor 108 and a diagnosis of the motor 108. The climate control module 102 evaluates the diagnosis of the motor 108 to assess the desired performance output of the blower unit 104. The diagnostic signal is represented by arrow 112.

Figures 3, 5:
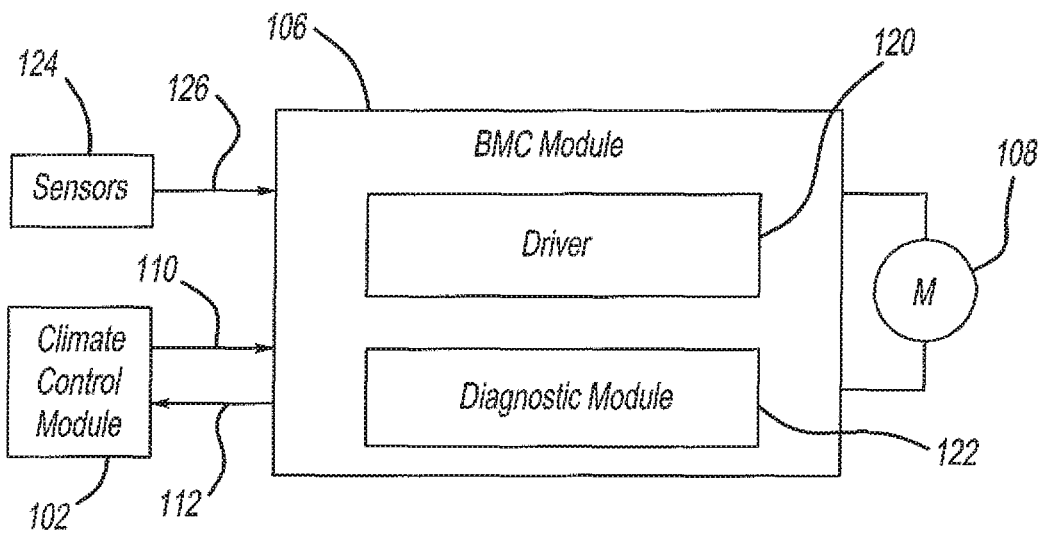
FIG. 3 is a block diagram of the BMC module.
FIG. 5 is a pulse code table that associates the plurality of modes with a number of pulses as a first signal code protocol for the plurality of modes.

With reference to FIG. 3, the BMC module 106 may include a driver 120 and a diagnostic module 122. The driver 120 drives the motor 108 based on the PWM signal 110 from the climate control module 102. The diagnostic module 122 determines the speed of the motor 108 (i.e., a motor speed) based on data from one or more sensors 124. For example, one or more sensors, such as a Hall sensor or temperature sensor, may be positioned near the motor to sense a physical parameter of the motor 108 and/or environment of the motor 108. Input signals from the sensors 124 are represented as arrow 126. The diagnostic module 122 performs a diagnostic on the motor 108 to determine a mode of the motor 108 based on data from sensors disposed at the motor 108 and prestored processes and/or data. The diagnostic module 122 then generates and transmits the diagnostic signal 112 based on the motor speed and the mode of the motor 108. The motor speed can be determined in any other suitable manner as well, such as by way of a feedback circuit, and is not limited to detection with the sensors 124. For example, the motor speed can be determined in the manner described in reference CN 204145346, the entire disclosure of which is incorporated herein by reference.

With regard to the mode of the motor 108, the diagnostic module 122 may identify one or more modes of the motor 108 from among a plurality of modes. As an example, FIG. 4 illustrates a performance mode table 200 that lists possible performance modes of the motor 108. For each of the modes listed, the table 200 defines an operation condition for the mode, an action for addressing the identified condition, and a reset operation. Based on the information received by the sensors and the conditions outlined in the table 200, the diagnostic module 122 determines the mode of the motor 108. For example, if the BMC module 106 determines that the motor 108 is not rotating based on data from a Hall sensor after a preset period of time (e.g., 2.7 seconds), the BMC module 106 may diagnose the motor 108 as a locked rotor. It should be readily understood that the diagnostic module 122 may be configured in various suitable ways to diagnose the motor 108 and output a predefined mode of the motor 108. For instance, the diagnostic module 122 may store and execute one or more diagnostic routines and output a mode of the motor 108 based on the routines.

The action defined in the table 200 for a given mode provides the steps taken to correct the detected mode. For example, the climate control module 102 may shut off power to the motor 108 or have the BMC module 106 shut off power to the motor 108 to address the locked rotor mode. The reset defines when or how the detected condition is cleared until the next occurrence of the condition. For example, after the power to the motor 108 is turned off, the BMC module 106 can be instructed to reset the locked rotor condition after 20 seconds for five total attempts, and the attempts will reset after the vehicle is restarted. Alternatively, the climate control module 102 may reset the condition and track the number of occurrences.

The plurality of predefined modes may include different types of modes, and is not limited to failure modes. As an example, in addition to failure modes, the plurality of modes may include a no failure mode in which the motor is operating properly (i.e., normal mode), and a warning mode in which the motor 108 is under specific characteristics that can or cannot result in a failure. Over heat A is one example of a warning mode. The plurality of modes from which the BMC module 106 may select can vary depending on the performance requirements of the motor 108 and, therefore, should not be limited to the modes defined in the figures and/or described herein. In addition, the BMC module 106 may identify, or in other words diagnose, the motor 108 with more than one mode.

The BMC module 106 transmits the diagnostic signal in real time to the climate control module 102 and includes two messages. The first message identifies the mode of the motor 108 as diagnosed by the BMC module 106, and may be referred to as a mode message. The second message provides information regarding the speed of the motor, and may be referred to as a feedback message. The motor speed provided in the feedback message can be determined in any suitable manner, such as by way of a feedback circuit, and is not limited to detection with the sensors 124.

Using a predetermined signal code protocol, a given mode is conveyed as a pulse signal. More particularly, each of the plurality of modes is associated with a specific coded signal that is transmitted as the mode message. For example, in a first embodiment of a signal code protocol of the present disclosure, each of the modes is associated with a specific number of pulses. FIG. 5 illustrates a pulse code table 300 that lists each of the modes and an associated number of pulses. Table 300 lists 11 different modes, and the number of pulses range from 1 to 11. The table 300 also provides the priority level of each mode. Modes with the same priority cannot occur at the same time.

Figure 6A:
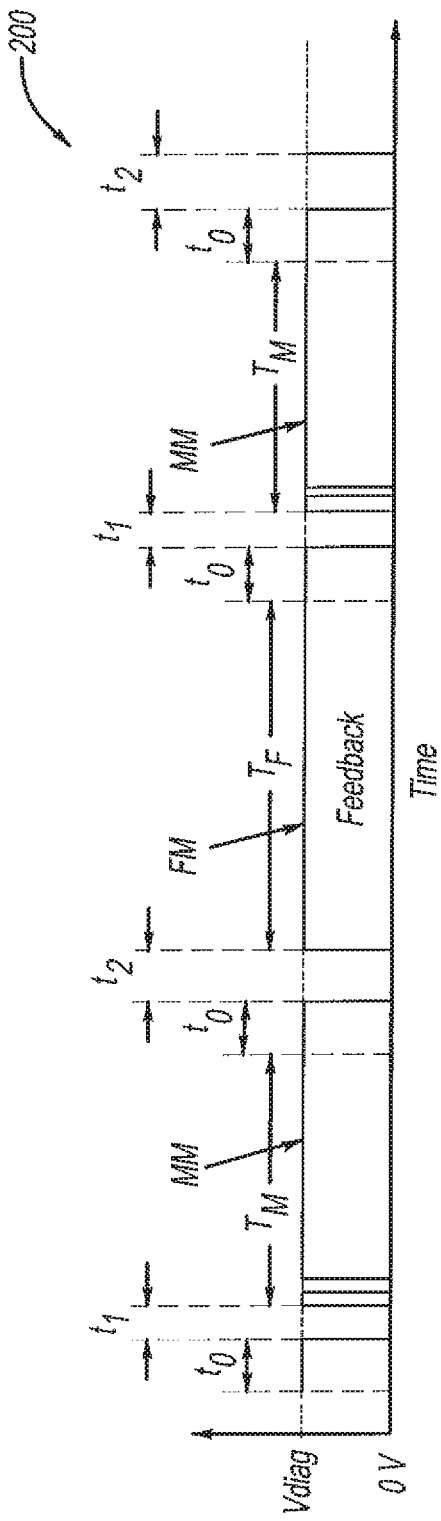
FIGS. 6A and 6B illustrate diagnostic signals that include a mode message and a feedback message based on the first signal code protocol.
Figure 6B:
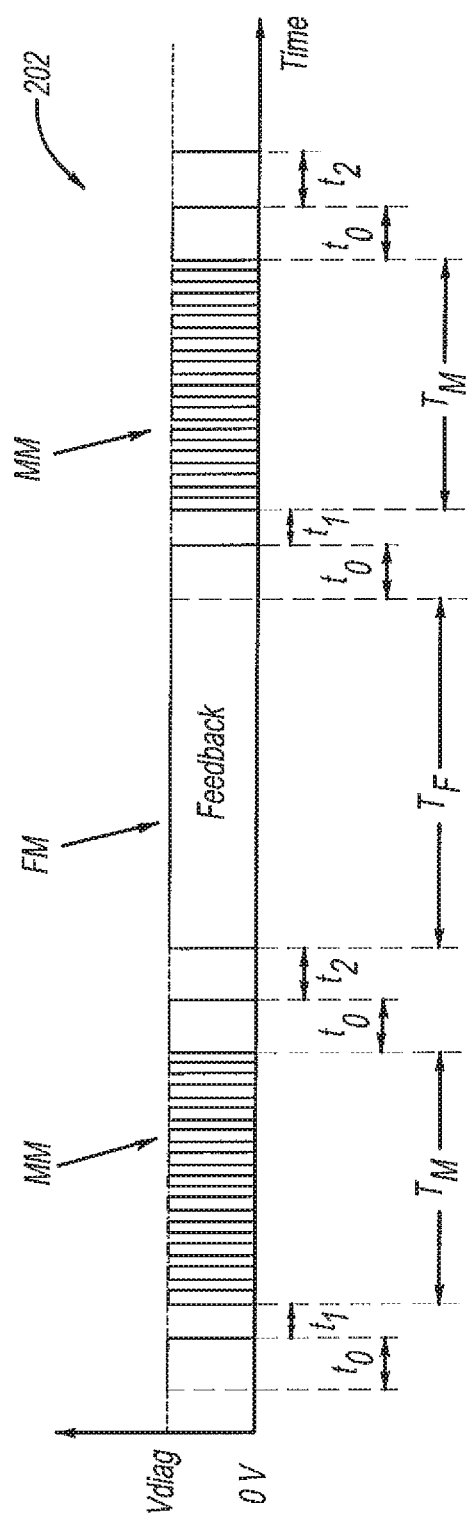

FIGS. 6A and 6B, illustrate examples of diagnostic signals 200 and 202, respectively. The diagnostic signals 200 and 202 are a series of pulses in which one cycle of a given diagnostic signal includes: a start/stop pulse ($t_0$), a mode message start pulse ($t_1$), the mode message (MM), the start/stop pulse ($t_0$), a feedback message start pulse ($t_2$), and the feedback message (FM). The mode message and the feedback message may also be referred to as a mode message signal and the feedback message signal of the diagnostices signal.

In the example embodiment, the start/stop pulse ($t_0$) is a 60 ms high pulse, and the mode message start pulse ($t_1$) and the feedback message start pulse ($t_2$) are both 30 ms low pulses. The duration and the polarity (i.e. high and low) of a given pulse can be changed and should not be limited to the examples provided herein. For example, while the start/stop pulse ($t_0$) is described as a 60 ms high pulse, the start/stop pulse ($t_0$) may have a different duration (e.g., 30 ms, 50 ms, 80 ms, etc.), and/or may be a low pulse (e.g., 0V).

The start/stop pulse indicates the start and stop of the diagnostic signal, and also separates the mode message and the feedback message. The mode message start pulse and the feedback message start pulse designate the start of the mode message and the start of the feedback message, respectively.

The mode message transmits the pulses associated with the mode of the motor identified by the BMC module 106. For example, the mode message of diagnostic signal 200 includes one pulse. Based on FIG. 5, one pulse represents no failure mode of the motor 108. In the diagnostic signal 202, the mode message includes 11 pulses indicating that the mode of the motor 108 is an input short to ground, as defined in FIG. 5. In the event that the BMC module 106 identifies more than one mode, the BMC module 106 transmits the pulse(s) associated with the mode having the highest priority in the mode message. For example, if the motor 108 is diagnosed with a current limitation and Over Heat A, the BMC module 106 will transmit information indicative of the Over Heat A mode via the mode message, since the Over Heat A mode has higher priority than the current limitation mode. Thus, the mode message will include five pulses.

While in the first embodiment of the signal code protocol each of the modes is associated with a specific number of pulses, other codes may be used for identifying the modes. As an example, in a second embodiment of a signal code protocol of the present disclosure, each of the modes is associated with a digit (e.g., 0, 1, 2, 3, 4, etc.). For instance, FIG. 7 illustrates a digit code table 400 that associates each of the modes with a digit that can be represented using binary form (e.g., 2=0010).

FIGS. 8A and 8B illustrate examples of diagnostic signals 204 and 206, respectively, which use the digit code table 400 for representing the mode of the motor 108. Similar to the first embodiment, the diagnostic signals 204 and 206 include: the start/stop pulse ($t_0$), the mode message start pulse ($t_1$), the mode message (MM), the start/stop pulse ($t_0$), the feedback message start ($t_2$), and the feedback message (FM).

In the second embodiment, the mode message transmits the digit associated with the mode identified by the BMC module 106. Specifically, the digits are represented in binary form in which "0" is represented with a high signal and "1" is represented with a low signal. As an example, in FIG. 8A, the mode message of diagnostic signal 204 includes four zeros, which is represented by a high level signal. Based on FIG. 7, four zeros represent the no failure mode of the motor 108. In the diagnostic signal 206 of FIG. 8B, the mode message includes three "0" and one "1" (i.e., high, high, high, low=1) indicating that the mode of the motor is an Over Current mode as defined in FIG. 7. While the present disclosure describes two specific signal code protocols, which can be prestored by the BMC module 106, it should be readily understood that other suitable protocols may be used and that the present disclosure should not be limited by the examples provided herein.

Figures 7, 9:
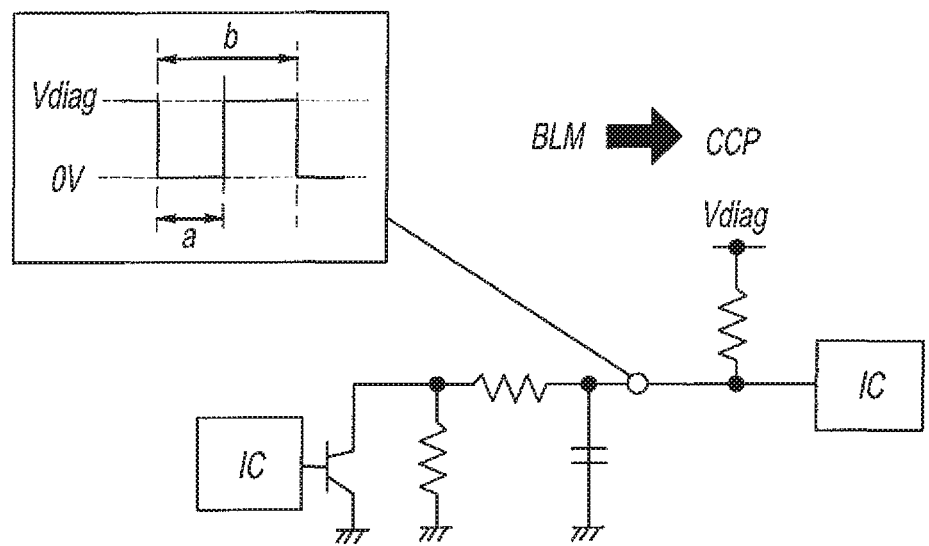
FIG. 7 is a digit code table that associates the plurality of modes with a digit as a second signal code protocol for the plurality of modes.
FIG. 9 is a schematic of a pulse width modulation output circuit.
Figures 10, 12:
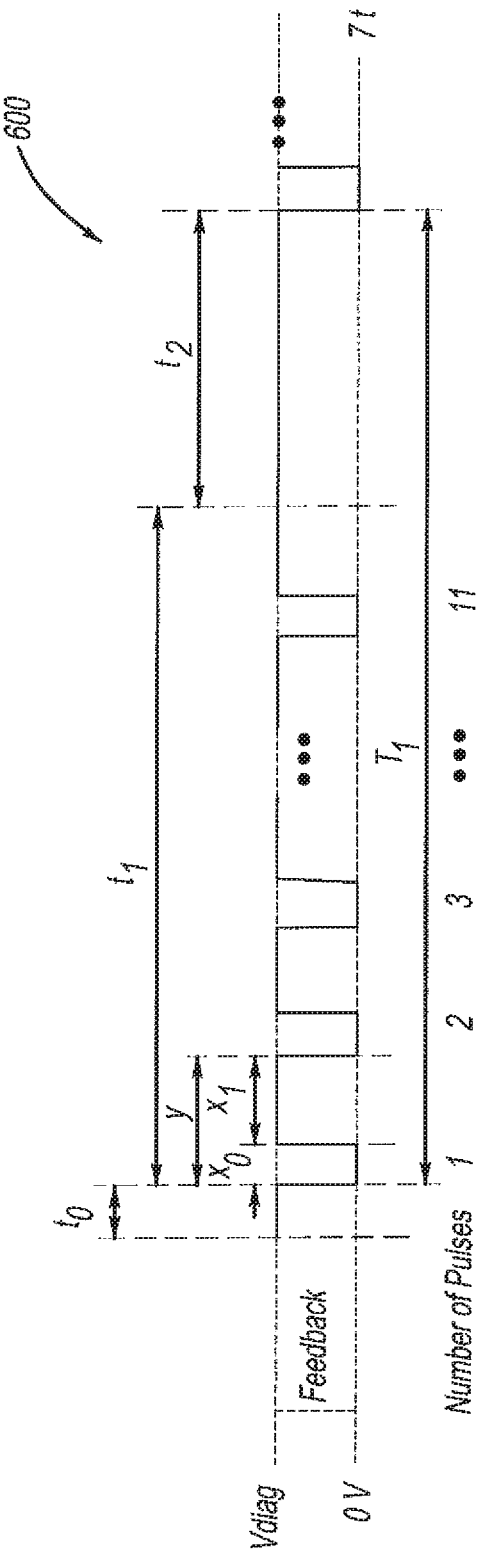
FIG. 10 is a table that illustrates parameters of the pulse width modulation output circuit of FIG. 9.
FIG. 12 illustrates a single mode message for a diagnostic signal.
Figure 11:
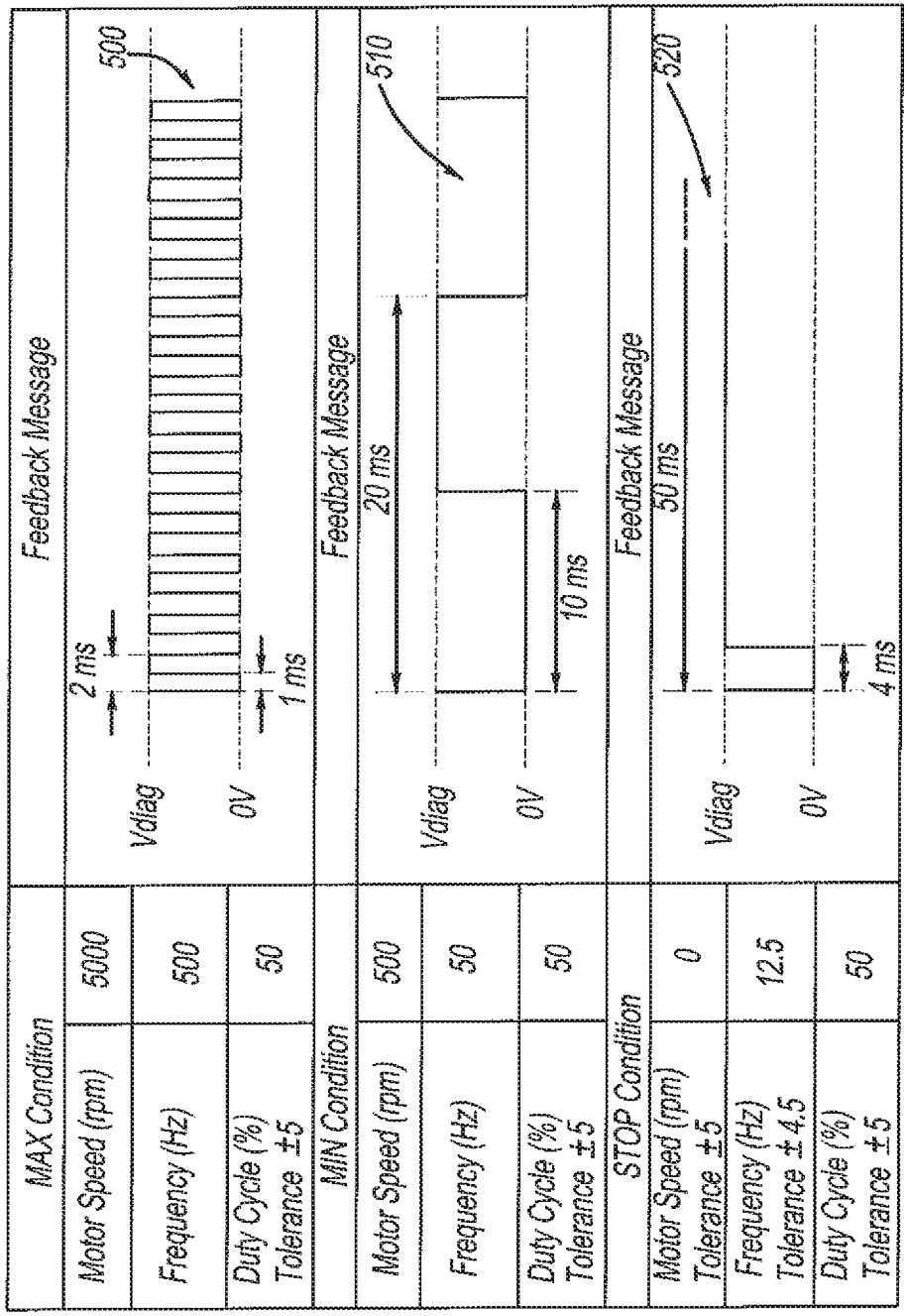
FIG. 11 illustrates examples of feedback messages to be transmitted as part of the diagnostic signal for selected motor speeds.

With reference to FIGS. 9-11, the feedback message of the diagnostic signal represents the speed of the motor 108. FIG. 9 illustrates a PWM output circuit diagram which shows the feedback message from the motor 108 to the climate control module 102, and FIG. 10 provides the blower motor PWM signal specification for two possible states: running and stopping.

The speed of the motor can be conveyed by a series of pulses. As an example, in FIG. 11, a feedback message 500 can be transmitted when the motor 108 is at a maximum motor speed, a feedback message 510 can be transmitted when the motor 108 is at a minimum motor speed, and a feedback message 520 can be transmitted when the motor 108 is in a stop condition.

The BMC module 106 may include predefined tables that associate one or more motor speeds with a specific feedback message. Based on the speed of the motor 108, the BMC module 106 is able to determine which of the predefined feedback messages is to be transmitted. While specific examples of a feedback message are provided, other feedback messages may be used for identifying a speed of the motor 108, and the present disclosure should not be limited to the examples provided herein.

In the example embodiments, the diagnostic signal is configured such that the mode message is transmitted prior to the feedback message. Alternatively, the diagnostic signal may be configured such that the feedback message is transmitted first and then the mode message is transmitted. Furthermore, while the mode message and the feedback message are illustrated as having different durations in FIGS. 6A, 6B, 8A, and 8B (e.g., mode message has a duration $T_M$ and feedback message has a duration $T_F$), the diagnostic signal may be configured so that the mode message and the feedback message have the same duration.

In the example embodiments, the mode message and the feedback message are transmitted once in one cycle. Alternatively, the mode message and/or the feedback message may be transmitted multiple times based on various parameters. As an example, FIG. 12 illustrates a mode message signal 600 in which the mode message is transmitted once and provides some of the key design parameters to be considered in transmitting the mode message. A message start pulse ($t_0$) is provided before the mode message signal 600 and indicates the start of the mode message portion of a diagnostic signal.

The mode message signal 600 transmits a particular mode of the motor using the pulse coding method of the first embodiment. The design parameters for the mode message signal may include: a total duration of the message using pulse coding ($t_1$); duration of low level portion of one pulse ($x_0$); duration of high level portion of one pulse ($x_1$); duration of one pulse (y); and mode message end pulse ($t_2$). Using the pulse coding of the first embodiment, the data length, or in other words the total duration of the mode message, is substantially equal to eleven pulses multiplied by the duration of each pulse (i.e., $t_1=11*y$). The time needed to transmit a mode message once is equal to the sum of the durations of the mode message and the end pulse (i.e., $T_1=t_1+t_2$).

Each of the design parameters can be configured to meet the requirements of the HVAC system, and should not be limited to a particular value. As an example, if the time needed to transmit a mode message once is set to a specific range (e.g., 110 ms≤$T_1$≤220 ms), the duration for transmitting the mode message (i.e., $t_1$) using a particular signal code protocol and the duration of the mode message end pulse ($t_2$) can be set so that $T_1$ is within the specific range.

Figure 13A:
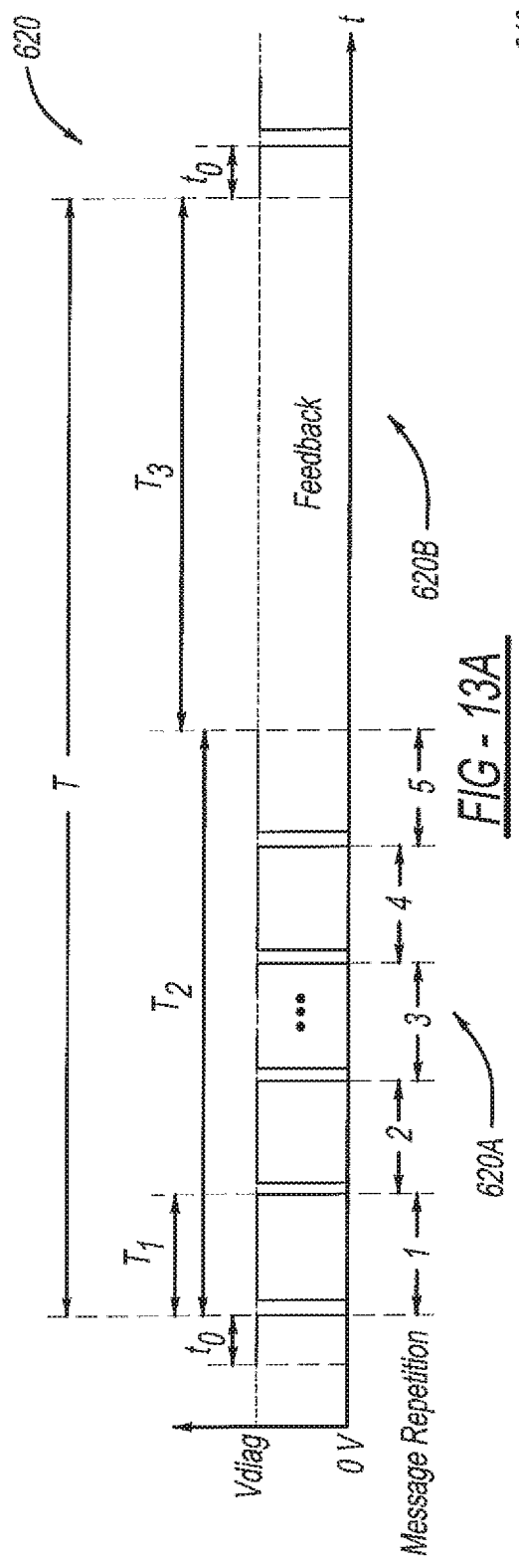
FIGS. 13A and 13B illustrate diagnostic signals that include multiple mode messages transmitted as part of a single transmission of the diagnostic signal.
Figure 13B:
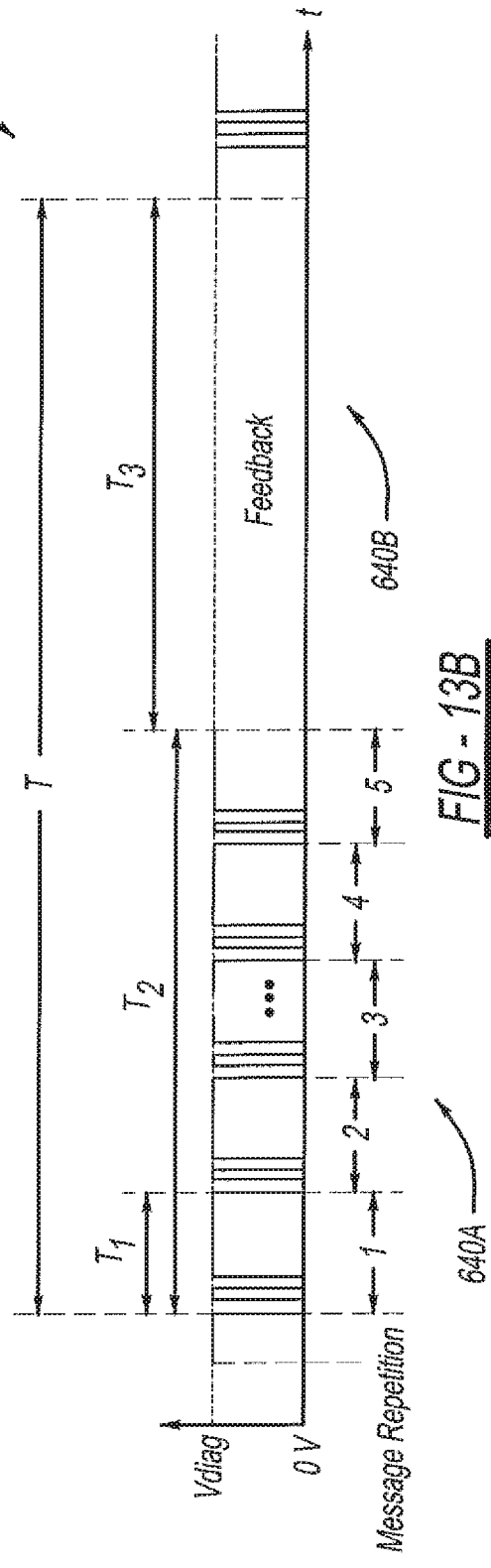

FIGS. 13A and 13B illustrate diagnostic signals 620 and 640, in which the mode message is transmitted five times in a single diagnostic signal. For example, the diagnostic signal 620 includes a mode message portion 620A that has a duration $T_2$ and a feedback message portion 620B that has a duration $T_3$. In the mode message portion 620A, a single transmission of the mode message has a duration of $T_1$, and therefore, the total duration for transmitting the mode message five times may be provided as: $T_2=T_1*5$. The total duration of the mode message portion 620A and the feedback portion 620B is provided as signal period T, where $T=T_2+T_3$. Accordingly, the diagnostic signal can be configured to transmit the mode message multiple times within a single signal transmission.

Similarly, in FIG. 13B, the diagnostic signal 640 includes a mode message portion 640A that has duration $T_2$ and a feedback message duration 640B that has a duration $T_3$. In the message portion 640A, a single mode message having a transmission duration of $T_1$ is transmitted five times within a single transmission of the diagnostic signal 640.

Figure 14:
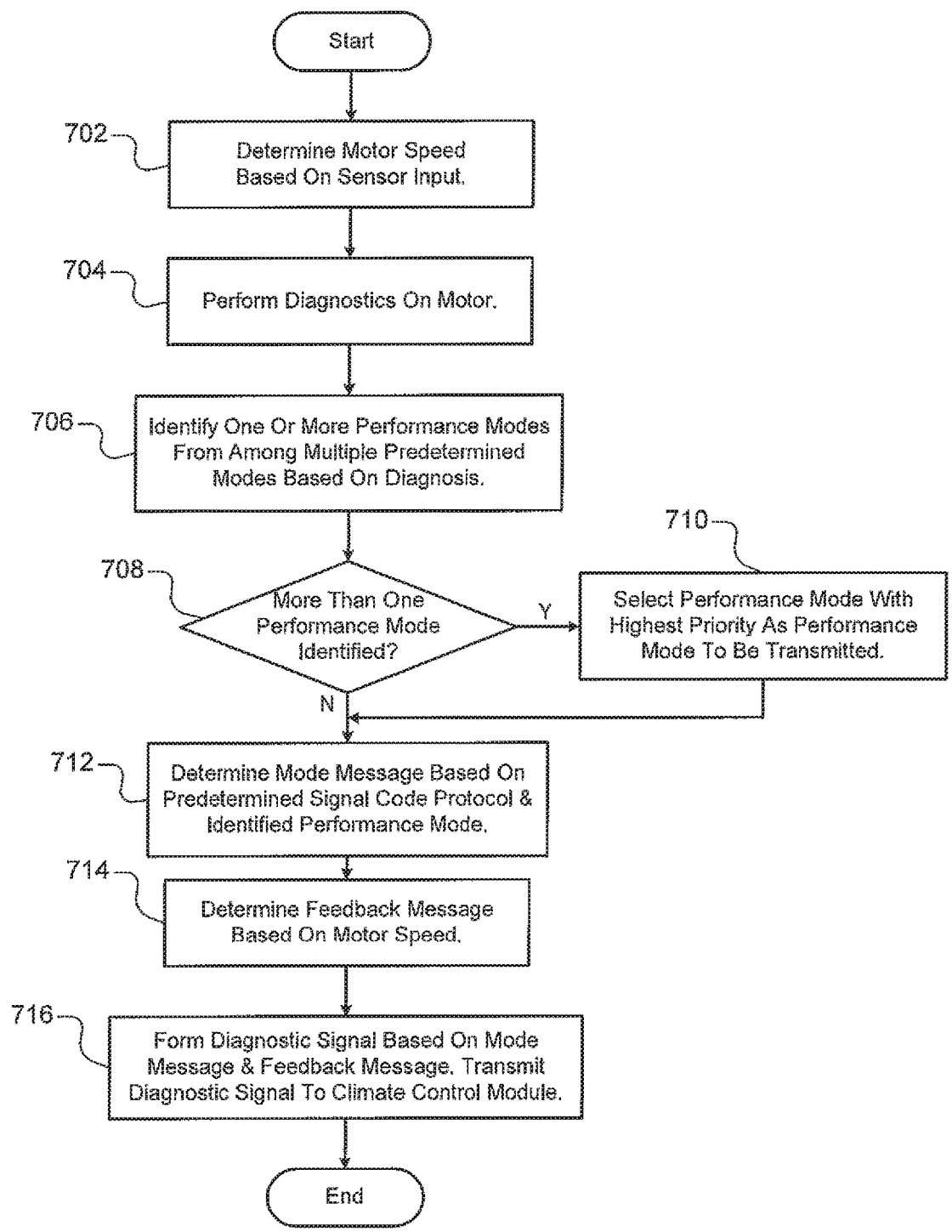
FIG. 14 is an example of a diagnostic routine for diagnosing a motor.

With reference to FIG. 14, an example implementation of a diagnostic routine is presented. The diagnostic routine may be performed by the BMC module of the blower unit. At 702, the BMC module may determine the speed of the motor based on inputs from one or more sensors, such as a hall sensor, and at 704, the BMC module may perform diagnostics on the motor. Specifically, the BMC module may include pre-stored algorithms and/or processes that are executed by the BMC module to evaluate the performance of the motor and diagnosis the motor.

Based on the diagnosis, the BMC module may identify one or more performance modes from among a plurality of predetermined modes stored in the BMC module, at 706. For example, the BMC module may store a table that lists possible modes of the motor (e.g., performance mode table 200), and the modes may include a failure mode, warning modes, and/or a normal operation mode. The BMC module may determine if more than one performance mode is identified at 708, and if so, the BMC module may select the performance mode with the highest priority as the mode to be transmitted to climate control module, at 710.

At 712, the BMC module may determine the mode message based on a predetermined signal code protocol stored by the BMC module and the identified performance mode. The signal code protocol associates each of the modes stored by the BMC module with a different coded signal, which is provided as the mode message. At 714, the BMC module may determine the feedback message based on the speed of motor, and then form and transmit a diagnostic signal based on the mode message and the feedback message to the climate control module at 716.

The present disclosure relates to a brushless motor with PWM control, so the method used to identify the modes may depend on the characteristics of the processor of the BMC module. The climate control module 102 and the BMC module 106 store a key that associates each of the modes with a specific code. Accordingly, the climate control module 102 may decode the diagnostic signal from the BMC module 106 to identify the mode of the motor and the speed of the motor. In addition, based on the identified mode, the climate control module may adjust the performance output of the motor 108 by adjusting the desired speed and/or may perform a predetermined action to address the mode.

The blower unit of the present disclosure not only operates a blower motor based on control signals from the climate control module, but also performs a diagnostic on the blower motor to determine the performance mode of the blower motor. The performance mode is transmitted to the climate control module as part of a diagnostic signal. Specifically, using a predetermined signal code protocol, the diagnostic signal includes a mode message that is a predefined pulse signal for representing a given performance mode. In addition to the performance mode, the diagnostic signal also transmits the speed of the blower motor by way of feedback message, which is also a pulse signal.

Using the diagnostic signal and pre-stored information for decoding the signal, the climate control module may identify the performance mode of the blower motor and, therefore, be able to control the performance output of the motor. Accordingly, the HVAC system of the present disclosure is able to effectively operate the blower motor by monitoring the performance mode of the blower motor.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

What is claimed is:

1. A method for monitoring the performance of a motor for a blower unit positioned in a vehicle, the method comprising:
    sensing one or more physical parameters of the motor by way of one or more sensors located at the motor;
    diagnosing, by a blower motor control module, the motor based on predefined criteria and the one or more physical parameters sensed by the sensors;
    identifying, by the blower motor control module, a performance mode from among a plurality of modes based on the diagnosis, wherein the plurality of modes are predefined and stored in the blower motor control module, wherein the plurality of modes include a motor failure mode, a motor no failure mode, and a warning mode in which the motor is under specific characteristics that can or cannot result in motor failure;
    determining, by the blower motor control module, a mode message based on a signal code protocol, wherein the mode message is indicative of the performance mode identified and the signal code protocol associates each of the plurality of modes with a different coded signal; and
    outputting, by the blower motor control module, a diagnostic signal that includes the mode message to a climate control module located in the vehicle separate from the motor.

2. The method of claim 1 further comprising:
    determining, by the blower motor control module, a speed of the motor, wherein the diagnostic signal includes a feedback message that is indicative of the speed of the motor.

3. The method of claim 1 wherein the signal code protocol associates each of the plurality of modes with a predefined number of pulses, as the coded signal, where each of the modes is associated with a different number of pulses.

4. The method of claim 1 wherein the signal code protocol associates each of the plurality of modes with a digit represented as a binary value, as the coded signal for a given mode, and each of the modes is associated with a different digit.

5. The method of claim 1 wherein the diagnostic signal includes a start pulse provided before the mode message and a stop pulse provided after the mode message.

6. The method of claim 1 further comprising:
    determining, by the climate control module, a desired operation speed of the motor based on information provided in the diagnostic signal;
    transmitting, by the climate control module, a pulse width modulation signal indicative of the desired operation speed to the blower control module; and
    operating, by the blower control module, the motor at the desired operation speed transmitted by the climate control module.

7. The method of claim 1 wherein the blower control module is positioned separately from the climate control module.

8. The method of claim 1 wherein identifying the performance mode further comprises:
    selecting, from among multiple performance modes identified, a high priority mode as the performance mode to be transmitted when more than one performance mode is identified.

9. A blower unit for a HVAC system provided in a vehicle, the HVAC system is controlled by a climate control module, the blower unit comprising:
    a blower motor operable to draw air into the HVAC system; and
    a blower motor control module including a driver and a diagnostic module, wherein the driver outputs a drive signal to the blower motor to operate the blower motor at a desired speed, and the diagnostic module diagnoses the blower motor with a performance mode identified from among a plurality of modes and transmits a diagnostic signal that includes a mode message indicative of the performance mode to the climate control module:
    wherein the plurality of modes include a motor failure mode, a motor no failure mode, and a warning mode in which the motor is under specific characteristics that can or cannot result in motor failure.

10. The blower unit of claim 9 wherein the blower motor control module stores a signal code protocol that associates each of the plurality of modes with a different coded signal to be transmitted as the mode message.

11. The blower unit of claim 10 wherein the signal code protocol associates each of the plurality of modes with a predefined number of pulses such that each of the modes is associated with a different number of pulses.

12. The blower unit of claim 10 wherein the signal code protocol associates each of the plurality of modes with a digit represented as a binary value such that each of the modes is associated with a different digit.

13. The blower unit of claim 9 further comprising:
    a sensor disposed at the motor and sensing a rotational speed of the blower motor, wherein the diagnostic signal transmitted by the blower motor control module includes a feedback message that is indicative of the speed of the blower motor.

14. The blower unit of claim 9 wherein the blower control module receives a pulse width modulation signal that is indicative of the desired speed of the blower motor from the climate control module.

15. The blower unit of claim 9 wherein the diagnostic signal includes a start pulse provided before the mode message and a stop pulse provided after the mode message.

16. The blower unit of claim 9, wherein a rotational speed of the blower motor is determined with a feedback circuit, and the diagnostic signal transmitted by the blower motor control module includes a feedback message that is indicative of the speed of the blower motor.

* * * * *